Figure 1:
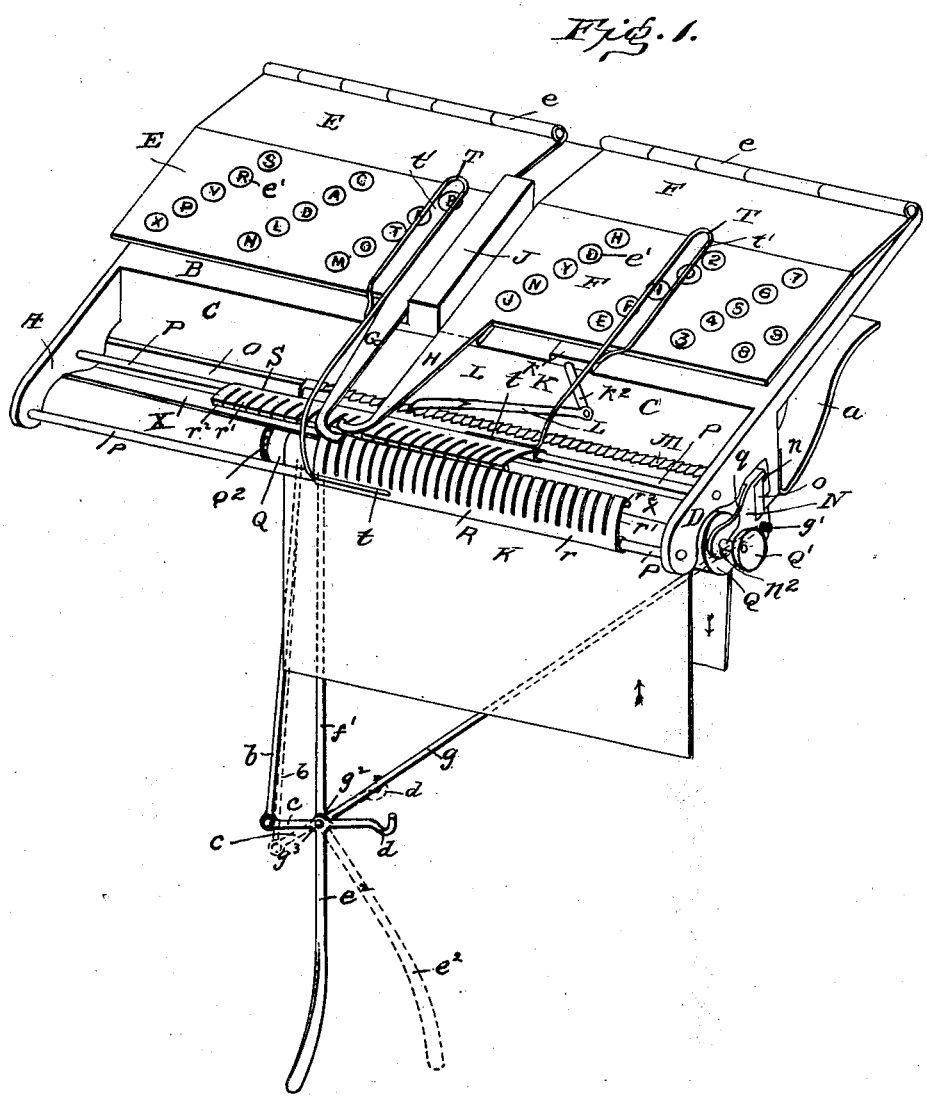

No. 703,689. Patented July 1, 1902.
W. H. YOUNG.
TYPE WRITER.
(Application filed Sept. 30, 1899.)
(No Model.) 4 Sheets—Sheet 1.

Witnesses:
Inventor:
W. H. Young
by H. H. Bliss
Attorney

No. 703,689. Patented July 1, 1902.
W. H. YOUNG.
TYPE WRITER.
(Application filed Sept. 30, 1899.)
(No Model.) 4 Sheets—Sheet 2.
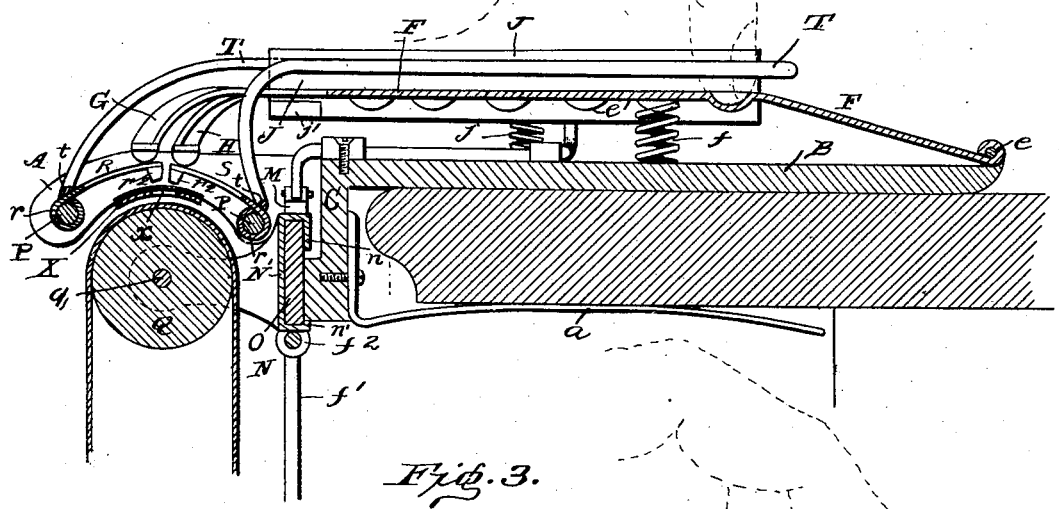
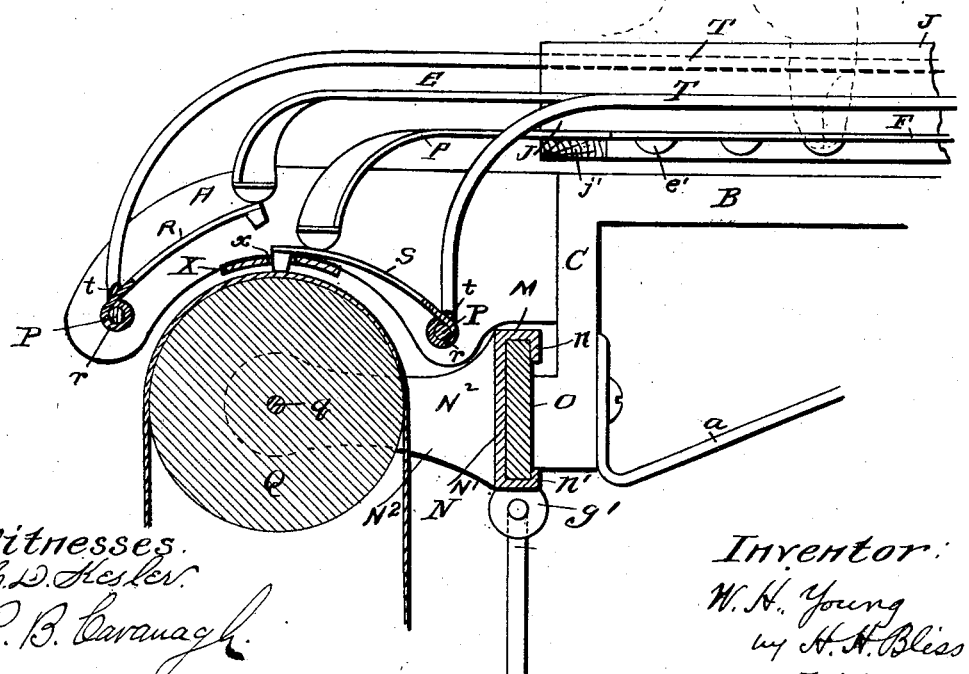
Witnesses.
C. D. Kesler.
R. B. Cavanagh.
Inventor:
W. H. Young
by H. H. Bliss
Attorney.

No. 703,689. Patented July 1, 1902.
W. H. YOUNG.
TYPE WRITER.
(Application filed Sept. 30, 1899.)
(No Model.) 4 Sheets—Sheet 3.
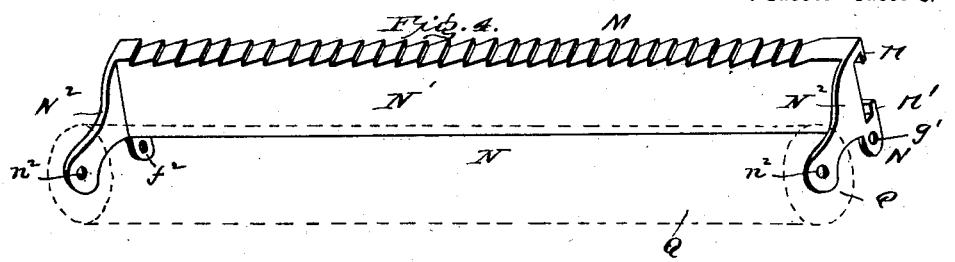
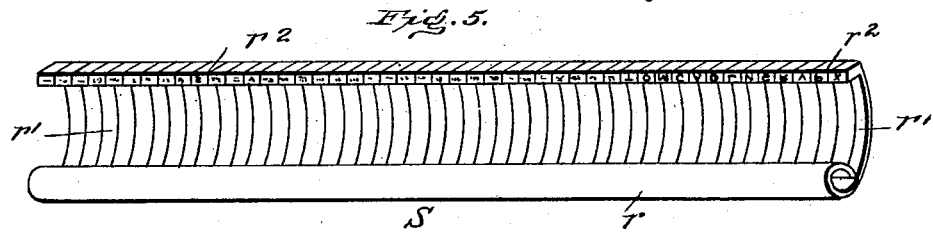
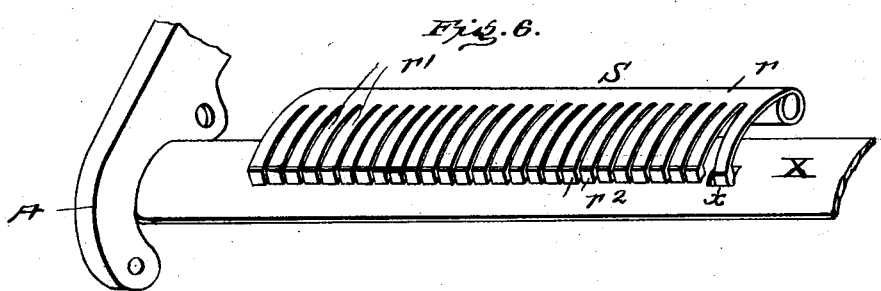
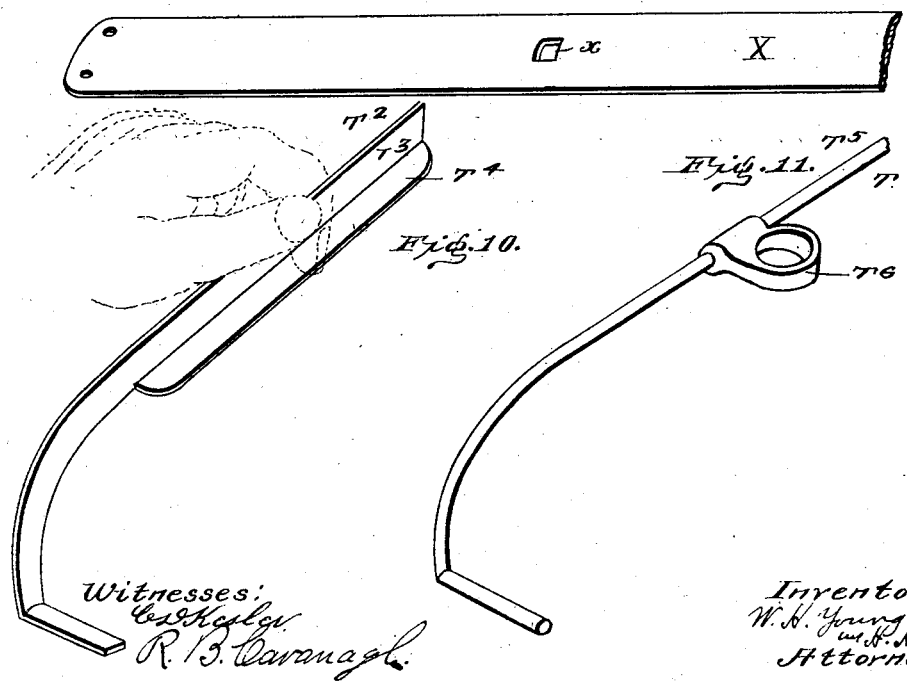
Witnesses:
Inventor:
W. H. Young
wt. H. H. Bliss
Attorney

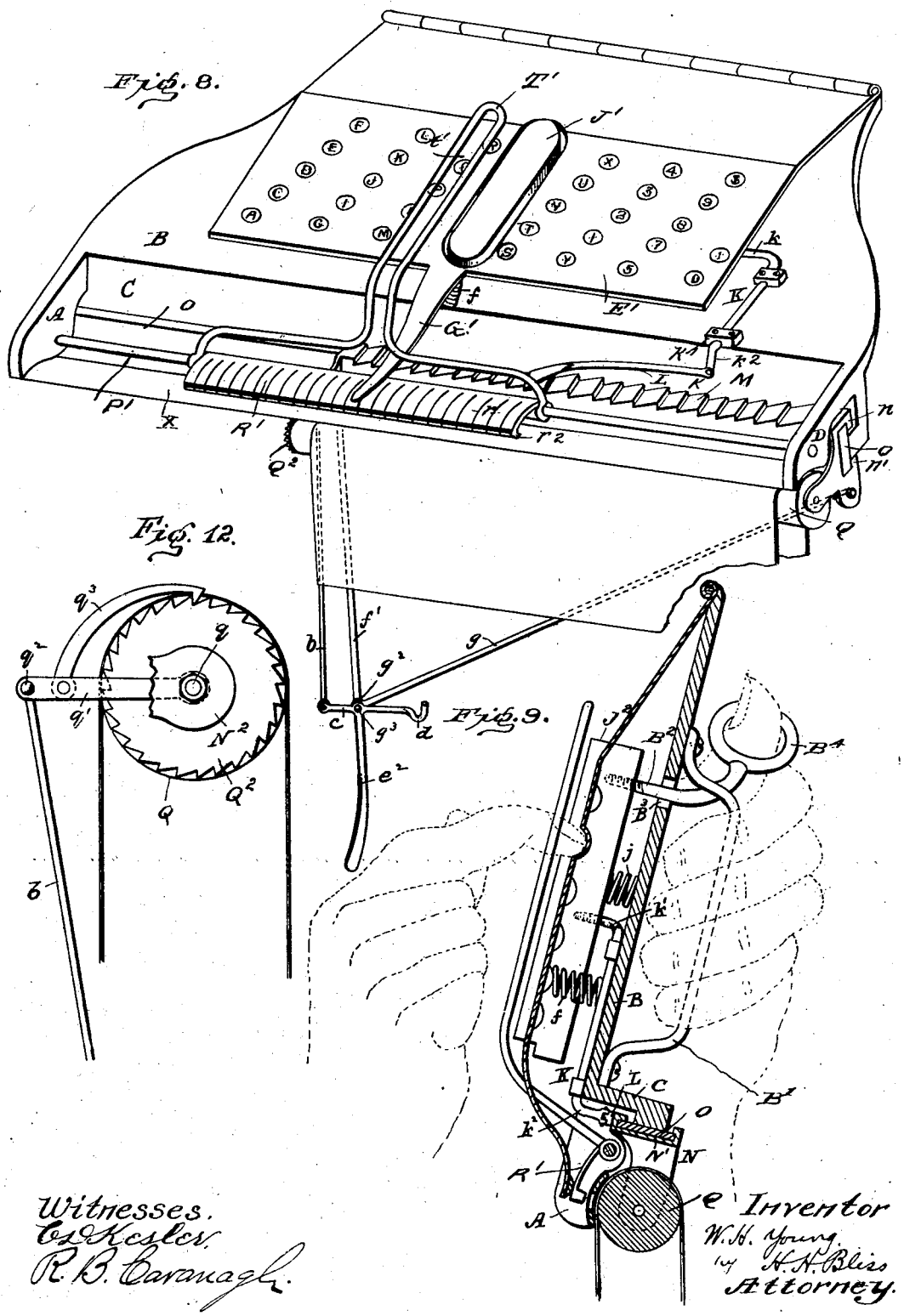

UNITED STATES PATENT OFFICE.

WILLIAM HENRY YOUNG, OF ATHENS, GEORGIA.

TYPE-WRITER.

SPECIFICATION forming part of Letters Patent No. 703,689, dated July 1, 1902.

Application filed September 30, 1899. Serial No. 732,246. (No model.)

*To all whom it may concern:*

Be it known that I, WILLIAM HENRY YOUNG, a citizen of the United States, residing at Athens, in the county of Clarke and State of Georgia, have invented certain new and useful Improvements in Type-Writers, of which the following is a specification, reference being had therein to the accompanying drawings.

My invention relates primarily to that class of type-writing machines in which the type are carried upon one or two slides or bars which are reciprocated or shifted to bring the desired type into position for printing, and has for its objects to simplify the machine and cheapen very much the cost of manufacture, at the same time maintaining a considerable degree of speed in operation.

In cheap and simple machines it has heretofore been necessary or usual in printing a character to perform three distinct operations—first, to look closely for the letter on a wheel or small bar; second, to see that the parts were brought accurately to the proper position for printing the letter; third, to impress the letter usually or often by the other hand. Such machines could not be worked in the dark or by blind persons or by those with one hand; nor could any rapidity be attained, such as business demands; nor could the sense of touch or locality be fully utilized, practically the only localizing sense used being that of sight.

By my invention I attain a cheapness of manufacture by lessening the number of parts and so shaping and organizing them that most of the elements of the machine may be made of thin metal or wire bent or stamped into form, which possess great strength and durability. I get speed by reducing the operation of finding and printing a character to what is practically a single movement of the finger, the sense of sight being used in a minor degree and the senses of locality and touch being principally availed of. To this end I employ a keyboard consisting of a movable plate for each hand, on which plate indicating letters and characters corresponding with the type are painted or inscribed or stamped in sunk or raised lines. These characters may have any usual or preferred arrangement and present the general appearance of an ordinary keyboard. The hand of the operator, however, in seeking a key travels over a continuous surface and is materially assisted in finding the desired character by the form of such surface and the sense of locality is fully utilized. While so moving, the finger engages a guide, which is carried with the finger and in turn moves the type, so that when the finger reaches the desired character the corresponding type is in position to be impressed by pressure on the keyboard, which pressure may be applied only by the finger which is on said character or with the assistance of other fingers on any part of the keyboard. Speed is also assisted by arranging the space-key for operation by the thumb of either hand, while both hands remain over the keyboard; also by providing an improved paper-shifting mechanism for actuation by the knee of the operator.

Further advantages attained by my invention are lightness and compactness, enabling the machine to be supported by one hand while operated by the other, if necessary, and thus used while walking, traveling, or collecting information from house to house in directory, census, or municipal work. On the desk it may readily be brought into position for work or put away like a book. Weight being eliminated to a great degree, I employ a mode of attaching the machine to a table or support by means of springs, which makes the machine very secure as well as easily handled.

A particular improvement in the paper-holding devices consists in arranging them at the front of the machine between the keyboard and the operator and over the lap of the latter, whereby space heretofore wasted is utilized, the paper may be rapidly inserted, and in telegraphic or other fast work the sheets may be allowed to drop out of the machine as finished. By this arrangement of the paper-holder the space above and beyond the keyboard is free for any copy which is to be followed.

The play of the type and type actuating or impressing devices is within narrow limits, there is no hammering, and the machine is practically noiseless.

In order to make my invention more clearly understood, I have shown in the accompanying drawings means for carrying the same into practical effect without limiting my improvements in their useful applications to the particular constructions which for the sake of illustration I have delineated.

In said drawings, Figure 1 is a perspective view of a type-writer embodying my invention in its usual or preferred form adapted for manipulation by both hands and the knee of the operator. Fig. 2 is a transverse sectional vertical view on line I I, Fig. 1. Fig. 3 is an end view of a portion of the same on a larger scale, partly in section. Fig. 4 is a perspective view of the paper-cylinder carriage. Fig. 5 is a perspective view of a type-bar adapted for use in the machine, seen from the under side. Fig. 6 is a perspective view of the type-bar and a portion of the frame and of the inking-strip. Fig. 7 is a perspective view of the inking strip or pad. Fig. 8 is a perspective view of a type-writer embodying certain of my improvements in another and simpler form, in which the type are arranged upon a single bar adapted for manipulation by one hand of the operator. Fig. 9 is a transverse sectional view of a type-writer embodying certain features of my invention in another form adapted for support and partial manipulation by one hand of the operator while the other hand performs the manipulation of the type-bar and other necessary operations. Fig. 10 is a perspective view of another form of bar or guide for the hand adapted to be attached to and actuate the type-bar for the purpose of bringing into operative position the particular character or letter desired to be impressed. Fig. 11 is a perspective view of another form of finger bar or guide for the same purpose. Fig. 12 is a detail view showing a means for turning the paper-roller to obtain the line-to-line spacing.

Referring to the drawings, and especially to Figs. 1 to 7, A B C D indicate the main frame of the machine, which I prefer to construct of thin metal stamped into the desired form, of which B is a horizontal plate adapted to rest upon a table or other suitable support, C a vertical stiffening-plate at the front edge of the part B, and A D arms or brackets extending forwardly from the parts B and C and adapted for the support of the type-bars.

$a\ a$ are strong springs attached to the main frame and adapted to securely grasp, in connection with the bed-plate B, the table or support to which the machine is applied.

O is a supporting and guiding plate secured to the plate C and adapted to carry and direct the paper-cylinder carriage in its transverse movements. Said carriage is shown at N, comprising a plate N′, adapted to engage the guide O, so that it will not become accidentally detached therefrom, but may slide freely thereon, as by flanges $n\ n'$, Fig. 3, forwardly-extending arms $N^2$, in the outer ends of which are provided bearings $n^2$ for the journals of the paper-cylinder, and a ratchet M, attached or formed at any suitable point—for instance, at the top of the plate N′—for regulating the step-by-step longitudinal movement of the paper-carriage.

Q is the paper-cylinder, mounted by journals $q$ in the bearings $n^2$, having a hand-wheel Q′ for rotating it when desired and a circular ratchet $Q^2$ for regulating the feed of the paper from line to line. It will be understood that any suitable traveling bands, roller or rollers, or other means may be mounted, as desired, upon the carriage N to coöperate with the roller Q in holding the paper from slipping, such auxiliary devices forming no necessary part of my invention.

X indicates the inking strip or pad, mounted fixedly or adjustably on the arms A D between the cylinder and the type—for instance, immediately over said cylinder. This strip consists, preferably, of a metallic support or bar having upon its surface next to the type means for retaining a supply of ink, such as a cloth or felt covering. At that point where the type perform their printing operation the strip or pad X is formed with an opening or transverse slot $x$, through which the particular type to be impressed upon the paper may pass, Fig. 3, to perform this function. This point is preferably at or near the middle of the machine.

R S indicate the type-bars, Figs. 5 and 6, which consist, preferably, of thin metal bent or stamped into the desired form to produce a longitudial bearing $r$, and separated elastic type-arms $r'$, at the outer ends of which are attached the type $r^2$. The arms $r'$ are capable of being individually pressed out of line of the other arms by devices hereinafter described to carry the desired type through the inking-strip against the paper, as seen in Fig. 6. The type-bars are mounted upon rods or guides P, fixed in the arms A D, which latter pass through the bearings $r$ in such manner that said bars may be moved longitudinally upon the rods to bring the desired character above the opening $x$. One suitable means for this purpose is shown in Figs. 1 to 3, consisting of hand or finger guides T, which extend across the bed-plate or portion thereof forwardly to the type-bars, to which latter they are attached at $t$. It will thus be observed that if the operator have a finger of each hand in the guides T the type-bars may be rapidly moved transversely of the machine, as desired.

Means for indicating at what point either of the guides T should be stopped to bring the desired letter or character of its attached type-bar in position for printing—that is to say, over the opening $x$—are furnished by movable indicator-plates E F, mounted above the bed-plate and flexibly connected therewith—as, for instance, by hinged joints $e$ at the rear thereof, Figs. 1 and 2. The plates E F are adapted to respectively impress the type-arms of the bars R S by actuating devices G H, which in the construction illustrated consist of arms formed integral with or attached to and extending from said plates to points respectively over the free edges of the type-bars and over or in line with the opening $x$. The upper surface of the plate E is provided with characters corresponding to those upon the bar R, so that when the guide T is above one of said indicating characters the type having the same character will be above and register with the opening $x$ and beneath and in alinement with the actuating device G. The plate F is similarly provided with indicating characters corresponding with the type upon the bar S. in addition to providing such indicating-marks upon the plates E F, I prefer to also form the latter so that the sense of touch will aid the operator in bringing the guide T directly above the indication of the character desired to be impressed, to which end I by preference form said plate, which will ordinarily be of stamped metal, with depressions $e'$, in which the indicating characters may be conveniently inscribed, which depressions or sockets will guide the finger of the operator and center the type to be impressed just before the depression of the actuating device G or H causes such impression to be made. It is obvious, however, that the plates E and F may be otherwise formed to effect this result without departing from my invention and that the indicating characters need not be inscribed directly in or on the depressions $e'$, but may be near them.

The spacing device for the longitudinal step-by-step movement of the paper-carriage is arranged so that it will be actuated by either of the plates E or F. To this end it conveniently consists of a bar J, situated at the middle of the machine between said plates and yieldingly supported from the bed-plate B by a spring or springs $j$, Fig. 2. At any suitable points the bar J is provided with lateral projections $j'$, adapted to be engaged by the plates or by the actuating devices G H in their downward movement, whereby the printing operation is accompanied by the usual longitudinal feed of the paper from letter to letter. The movement of the space-bar J is communicated to the paper-carriage by suitable mechanism. I have shown a simple appliance for this purpose, consisting of a rocking lever K, mounted at $k$ in a bearing upon the bed-plate B, having an arm $k'$, which is engaged by the space-bar J, and an arm $k^2$, which carries a spacing-pawl L. The latter engages the ratchet M, as best seen in Fig. 1. When a character is impressed and the bar J thereby depressed or when the space-bar alone is depressed, the operation of the lever K is such as to cause the pawl L to take a new tooth upon the ratchet M. As the space-bar returns to its normal elevated position the lever-arm $k^2$ is moved (to the left in Fig. 1) so as to cause the ratchet M and the paper-carriage to be fed one space.

It will be observed that the location of the space-bar J is such that it may be conveniently operated by the thumb of either hand, whichever happens to be the nearer to the middle of the machine.

The plates E and F are normally held with the actuating devices G H in such positions as not to interfere with the normal positions of the type-arms $r'$ by a spring or springs $f$, Fig. 2.

Where more than one type-bar is employed, as in the machine thus far described, they will be mounted so as not to interfere with each other in their reciprocation, but so that the type of either bar may be depressed through the opening $x$ to the same line upon the paper. Such an arrangement is shown in Fig. 3, depending in that construction upon the locations of the rods P relative to the circumference of the roller Q, which is such that the type-bars as a whole entirely clear each other, while the individual type of either bar may be depressed upon the same line upon the paper.

While the rotary feed of the paper-cylinder from line to line may be effected by hand by means of the wheel $Q'$, I prefer to provide an independent feeding means adapted for actuation without the use of either hand, as by means of the knee of the operator. To this end I provide the carriage N with a depending frame of any suitable character. I prefer to construct this of rods $f'$ $g$, secured to the carriage at $f^2$ $g'$ and united at their lower ends to form or carry a bearing $g^2$. A pivot $g^3$ in said bearing carries a rocking lever $e^2$ $c$, the arm $e^2$ of which is adapted to be engaged by the knee of the operator and the arm $c$ of which is connected by rod $b$ with a cylinder-rotating pawl or mechanism of any suitable character. $d$ is a stop-arm attached to the lever $e^2$ and adapted to engage the rod $g$ to limit the play of the cylinder-rotating mechanism.

The type-writer mechanism above described may be readily adapted and even simplified for operation by one hand. Such a machine I have shown in Fig. 8, in which one of the type-bars is eliminated and all the necessary type mounted upon a single bar $R'$, traveling upon a single rod $P'$. Correspondingly a single indicator-plate $E'$ is employed, carrying a set of indicating characters which agree with the type upon the bar. The finger-guide and type-bar actuator is shown at $T'$ and is adapted to travel over the plate $E'$ from one side to the other of the machine. Said guide has an open slot or space $t'$ for the finger and is shown as attached to both ends of the type-bar to enhance the rigidity of the guide relative to the bar. The space-bar $J'$ is somewhat lower to enable the guide $T'$ to pass above it from side to side of the plate $E'$. A single type-actuating device $G'$ is sufficient, which may be centrally arranged upon the plate E, as shown.

In Fig. 9 I have shown a form of my invention especially adapted for out-door work or for any use where a table or fixed support for the machine is not available. The type-actuating devices may be of substantially the character shown in Fig. 8. The bed-plate is provided with a handle B' at any convenient point, as upon its under side, by means of which the machine may be supported and carried by one hand while it is actuated by the other. In this construction I have further provided for spacing by means of the supporting-hand, as by an arm B², fixed to the space-bar J², extending through an aperture B³ in the bed-plate and having a ring B⁴, which may be engaged by the thumb of the supporting-hand for the operation of the space-bar.

It will be understood that the finger-guide and type-bar actuator may take various forms without departing from my invention. As shown in Figs. 1 to 3, it may be of wire bent to form the finger opening or slot t', extending for the width of the space occupied by the indicating characters of the type-actuating plate with a single point of attachment to the type-bar. It may be substantially similarly formed, but with more than one point of attachment to the type-bar, as seen in Fig. 8. It may also be formed without a finger-guiding slot, as seen in Figs. 10 and 11, but with other means for engagement by the hand or finger to keep the latter in proper relation thereto. Thus in Fig. 10 the guide is shown at T² formed with a vertical flange T³, adapted for convenient engagement by the thumb and finger, which may play longitudinally of the bar and bring the latter into proper position as the finger detects the desired indication upon the indicator-plate. A flange T⁴ serves to stiffen the guide and might be employed as a visual indicator to register with the indications on the plate.

In Fig. 11 the guide comprises a rod T⁵, upon which slides a ring or thimble T⁶, which will receive the finger and protect the latter from rubbing upon the rod.

It will be understood that in shifting the paper the lever $e^2$ may also effect the longitudinal return of the paper-carriage, the engagement of the stop-arm $d$ with the rod $g$ rendering the lever $e^2$ for the time being rigid with the frame $g\ f'$ and the carriage.

The inking operation is obvious from the foregoing description. When the desired type is impressed, the remaining type of that type-bar are brought into contact with the inked surface of the inking-strip, so that all of the type are continually kept freshly inked. When the impressed type is released, all of the type spring up from the inking-strip out of contact therewith.

It will be understood that the paper-carriage may be controlled by a spring in the usual manner as to its longitudinal movement and by any usual pawl or retaining device to hold it in position subject to feed by the pawl L, if such controlling means are desired.

Referring to the construction shown in Fig. 9, if it is desired to use the hand-machine on a table or fixed support this may be done by removing the handle B' and the arm B², the spacing operation being then performed by pressure upon the upper side of the bar J².

In Fig. 12 is shown a simple mechanism whereby the movement of the rod $b$, heretofore described, is caused to turn the paper-cylinder Q to effect the line-to-line spacing. Said mechanism comprises a lever $q'$, pivotally mounted upon the journal $q$ of the cylinder and having the rod $b$ pivoted to its outer end at $q^2$. Said lever carries a pawl $q^3$, which engages the ratchet Q² to turn the paper-cylinder one space at each movement of the rod $b$ in a well-known manner.

What I claim is—

1. In a type-writer, the combination of a paper-holding mechanism, a type-bar having a plurality of arms, a type on the free end of each arm, a type-impressing mechanism comprising a movable indicator-plate having thereon in different positions indicating characters corresponding with the type, and a finger-guide connected with the type-bar and situated over or along said plate, substantially as set forth.

2. In a type-actuating mechanism for type-writers, a type-bar having a plurality of arms, types on the free ends of the arms, a movable plate or keyboard having characters corresponding with the type of said bar, means carried by said plate for actuating the type individually, and means for shifting the type-bar, substantially as set forth.

3. In a type-actuating mechanism for type-writers, the combination of a sliding type-bar having a series of individually-movable type-arms, a type on the free end of each arm, means for shifting said bar, and devices for individually impressing the type, substantially as set forth.

4. The combination of a movable type-bar having a series of individually-movable type, arms extending therefrom, a type on the free end of each arm, devices for individually impressing the type, and a guide connected with said bar to shift the same and adapted to guide the finger in directions across the lines of movement of said guide, substantially as set forth.

5. The combination with paper holding and shifting devices, of a keyboard consisting of two independently-movable plates, each provided with indicating characters, two movable bars provided respectively with individually-movable projecting arms carrying on their free ends type corresponding with said characters, finger-guides attached to the type-bars and each extending over or along the plate corresponding with its type-bar, type-impressing devices actuated by said plates, and an inking device, substantially as set forth.

6. A type-bar for type-writers of thin sheet metal, having one edge bent toward the body of the bar to form a longitudinal sliding bearing-sleeve and partially divided to form partially-separated resilient arms, and a series of type fixed on said arms.

7. In a type-writer, the combination with a bed-plate or frame adapted to be held on any suitable support, type-actuating means and printing devices, of a paper-holding cylinder or roller situated at the front end of said frame between the operator and the type-actuating means, forward of the front edge of the bed-plate and adapted to hold the paper suspended in front of said support, substantially as set forth.

8. In a type-writer, the combination with a bed-plate or frame, and printing devices comprising a type-operating indicating-plate or keyboard at the upper rear part of said frame, of a paper-holding cylinder or roller mounted at the front of said frame forward of the front edge of the indicating-plate or keyboard, whereby the paper is situated below the wrists of the operator and the space above the keyboard left free for copy, substantially as set forth.

9. In a type-writer, the combination with paper holding and shifting devices and movable type-bars, of a keyboard comprising a movable plate having depressions therein for the finger of the operator, said depressions having indicating characters corresponding with the type, a finger-guide connecting with the type-bar and extending along or over said plate for the space occupied by said depressions and arms attached to the plate to contact the type, substantially as set forth.

10. In a type-writer, the combination of paper holding and shifting mechanism, printing devices, a bed-plate or frame therefor, means on the under side of said frame for supporting the machine in the hand, and a connection extending from said shifting mechanism to the under side of said frame for effecting the spacing operation by the supporting-hand, substantially as set forth.

11. In a type-writer, the combination of paper holding and shifting mechanism, printing devices comprising two movable indicator-plates, type-bars corresponding each with one of said plates, means for actuating said bars, means carried by the indicator-plates to impress the type and a spacing device or bar situated between said plates and connected with said shifting mechanism, substantially as set forth.

12. In a type-writer, the combination of paper holding and shifting mechanism, printing devices comprising two indicator-plates, type-bars corresponding with each of said plates, means for actuating said bars, means carried by the indicator-plates to impress the type, a spacing device or bar situated between said plates and extending in directions toward and from the operator, and adapted to be operated by the thumbs while the hands are respectively over said plates, and connections between the spacing-bar and said shifting mechanism, substantially as set forth.

13. In a type-writer, the combination with printing devices, of a paper-holding roller, carried by the same, and means for moving said roller, extending within reach of the knee of the operator, comprising rods secured to the carriage and united at their lower ends, a lever having a depending arm and an arm at right angles thereto fulcrumed at the union of said bars, a stop to limit the movement of the lever, and a rod having a pawl to engage the ratchet on the roller substantially as set forth.

14. In a type-writer the combination with paper-carrying means, of two supporting-bars, two type-bars slidingly disposed on said bars and arranged at opposite sides of the line of impression, arms on said bars provided with type for carrying the latter to said line of impression, means for actuating said arms individually, and actuating devices for sliding said type-bars bodily to bring the desired type into operative position.

15. The combination, with paper-carrying means, of two sliding type-bars arranged at opposite sides of the line of impression, spring-arms on said bars provided with type, supports on which said bars reciprocate, means for actuating the arms individually, and actuating devices for moving the bars bodily.

16. In a type-writer, the combination of a movable set of type supported to slide transversely of the machine, and pivoted, and oscillatory for the purpose of impression, means for turning said set of type on its pivot and shifting said set of type, impression devices for actuating said type individually, an inking device extending across the machine parallel with the path of said set of type and having an opening at the printing-center, and means for supporting the inking device at its ends at the sides of the machine.

17. In a type-writer, the combination of a paper holding and shifting mechanism, a movable set of type, a guide for the same, a movable indicating-plate having characters corresponding with the type, adapted to be operated by the finger and having means for impressing the type individually, and a type-shifting device extending along said plate and adapted to be engaged laterally by the finger of the operator.

18. A type-bar-shifting device consisting of the combination, with a type-bar, of a movable indicator-plate, having characters corresponding with the type, and adapted to be operated by the finger, and a bar or arm for actuating the type-bar, extending along said plate and having a space or aperture for the passage of the finger of the operator.

19. In a type-writer, the combination of a paper-holding mechanism, a type-bar having a plurality of type, a type-impressing mechanism comprising a movable indicator-plate having thereon indicating characters corresponding with the type, and a shifting means for said bar situated along said plate and having an aperture for the finger of the operator.

20. The combination of a shifting type-bar, a movable indicator-plate adapted to be operated by the finger, and having indicating characters corresponding with the type of said bar, and a type-bar shifter adapted to be engaged laterally by said finger.

21. The combination of a rectilinearly-moving type-bar, a movable indicating-plate adapted to be operated by the finger and having characters corresponding with the type of said bar, and a type-bar shifter adapted to be engaged laterally by the finger and situated along said plate.

22. In a type-writer, an impression mechanism, consisting of the combination of a rectilinearly-sliding type-bar, an indicating-plate having means for impressing the type of said bar, and having a number of type-indicating marks at different distances from the path of said bar, and an actuating-arm connected with the bar, extending over said plate and having an elongated opening for the passage of the operator's finger.

23. In a type-writer, the combination of a movable type-bar, a movable indicating-plate situated at the rear of the machine and having a type-impressing arm stiffly connected with the plate and extending forward to said bar, a paper-holding means at the front of the machine in line with the type of said bar, and means for shifting the bar, consisting of a finger-arm connected with the bar and extending rearwardly over said plate.

24. A type-writing machine, adapted to rest at its rear upon a table with its front part overhanging the same and having a downward-extending shoulder for engaging the front edge of the table, and holding means for securing the machine in such position, the said machine having a paper-holding device on said overhanging part adapted to suspend the paper in front of such table.

25. A type-writing machine adapted to rest at its rear upon a table with its front portion overhanging the same, and having a downward-extending shoulder for engaging the front edge of the table and holding means for securing the machine in such position, said machine having a paper-holding roller mounted at the front part of the machine and adapted to suspend the paper on front of such table, and having a type-operating keyboard at the rear part of the machine which is over the table.

26. A type-writing machine adapted to rest at its rear part upon a table with its front portion overhanging the same, and having a paper-holding device on said overhanging part, below the bottom of the rear part of the machine and adapted to suspend the paper in front of such table.

In testimony whereof I affix my signature in presence of two witnesses.

WILLIAM HENRY YOUNG.

Witnesses:
N. CURTIS LAMMOND,
RICHARD B. CAVANAGH.